(12) United States Patent
Kilvington et al.

(10) Patent No.: US 7,238,027 B2
(45) Date of Patent: Jul. 3, 2007

(54) DEVICE FUNCTIONALITY REPRESENTATION TOOL

(75) Inventors: Kari Kilvington, Shoreview, MN (US); Arrick Olson, Shoreview, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 234 days.

(21) Appl. No.: 10/895,275

(22) Filed: Jul. 20, 2004

(65) Prior Publication Data

US 2006/0019226 A1    Jan. 26, 2006

(51) Int. Cl.
*G09B 29/00* (2006.01)

(52) U.S. Cl. ...................... 434/430; 434/262

(58) Field of Classification Search ............... 434/188, 434/207, 211, 213, 214, 262, 265, 365, 374, 434/428, 430
See application file for complete search history.

(56) References Cited

U.S. PATENT DOCUMENTS

| | | | | |
|---|---|---|---|---|
| 3,093,919 A | * | 6/1963 | Holtz | 40/621 |
| 3,755,938 A | * | 9/1973 | Bytwork | 40/530 |
| 4,091,549 A | | 5/1978 | Driller et al. | |
| 4,416,633 A | | 11/1983 | Gulack | |
| 4,584,223 A | * | 4/1986 | Krapf | 428/58 |
| 5,027,540 A | * | 7/1991 | Schwarz | 40/490 |
| 5,290,766 A | * | 3/1994 | Choong | 514/23 |
| 5,343,625 A | * | 9/1994 | Chen et al. | 33/403 |
| 5,496,361 A | * | 3/1996 | Moberg et al. | 607/122 |
| 5,535,317 A | * | 7/1996 | Tanaka et al. | 345/440 |
| D373,303 S | * | 9/1996 | Bailey | D8/373 |
| 5,799,423 A | * | 9/1998 | Malino | 40/107 |
| 5,800,182 A | * | 9/1998 | Carson et al. | 434/430 |
| 6,132,217 A | * | 10/2000 | Dickson | 434/211 |
| D436,627 S | * | 1/2001 | Bardet | D19/90 |
| 6,304,377 B1 | * | 10/2001 | Murr | 359/443 |
| 6,527,558 B1 | | 3/2003 | Eggert et al. | |
| 6,638,073 B1 | | 10/2003 | Kazimirov et al. | |
| 6,922,580 B2 | * | 7/2005 | DeMeester et al. | 600/413 |
| 6,941,167 B2 | * | 9/2005 | Stahmann et al. | 600/523 |
| 6,945,247 B1 | * | 9/2005 | Stamler et al. | 128/200.14 |
| 6,993,389 B2 | * | 1/2006 | Ding et al. | 607/25 |

(Continued)

OTHER PUBLICATIONS

Ellenbogen, Kenneth A., et al., "Device therapy for congestive heart failure", *Saunders an Imprint of Elsevier. Philadelphia PA*, (2004), 268-278.

(Continued)

*Primary Examiner*—Kurt Fernstrom
(74) *Attorney, Agent, or Firm*—Schwegman, Lundberg, Woessner, & Kluth, P.A.

(57) ABSTRACT

An apparatus for demonstrating cardiac device function and patient cardiac function over time, including a board with a coordinate system representing time, the board having one or more colored areas representing cardiac device function and patient cardiac function and a legend. Assembled magnetically to the board are objects sized for alignment with the coordinate system representing cardiac device function and including colors matching the one or more colored areas of the magnetic board and the legend. The assembled object and board demonstrate cardiac device function over time. The present subject matter also includes a method for demonstrating cardiac device function and patient cardiac function over time, including placing the objects on a magnetic board in alignment with the coordinate system and one or more colored areas representing cardiac device function and patient cardiac function to demonstrate cardiac device function over time.

20 Claims, 4 Drawing Sheets

U.S. PATENT DOCUMENTS

2002/0095840 A1* 7/2002 Seiber et al. ............... 40/606
2003/0133165 A1* 7/2003 Kim ......................... 358/296
2004/0221496 A1* 11/2004 Ko ............................ 40/471
2005/0086200 A1* 4/2005 Kirkman ..................... 707/2

OTHER PUBLICATIONS

"AICD System Guide, Model 1900 Ventak Prizm", *Guidant Corporation*, (Apr. 01, 2002), 5-39 to 5-44 (18 pgs.).

* cited by examiner

DEVICE FUNCTIONALITY REPRESENTATION TOOL

FIELD OF THE INVENTION

This disclosure relates generally to teaching aids, and more particularly, to a teaching aid used to demonstrate cardiac pacing system function.

BACKGROUND

Medical devices are used to stimulate physiological changes in the cardiac system. Specifically, medical personnel treat abnormal heart conditions using devices such as pacing systems. For example, pacing systems are implanted in a patient and connected to the cardiac system to apply therapy. Pacing systems can often apply a therapy automatically. Automatic application of therapy can reduce the time between problematic function of the cardiac system and corrective therapy. The time saving aspects of pacing systems can save a patient's life.

These devices are sophisticated and include various complex functions. Using them properly requires training. Particularly, a tool is needed which represents timing intervals, refractory periods, protection periods, paced atrial events, sensed atrial events, paced ventricular events, sensed ventricular events, and other associated aspects of cardiac pacing system operation. Useful designs mimic the interaction between the heart and the device.

Persons learning about medical devices, and, more specifically, pacing systems, benefit from teaching aids which efficiently and effectively model device behavior in relation to patient behavior. Nurses, medical students, pacemaker clinical technicians, and persons involved in the development, production, and sales of pacing systems and other cardiac devices are among those who would benefit. Therefore, there is a need for a training aid which is useable by a wide range of individuals having various levels of background knowledge.

Additionally, a need exists for a training aid which is inexpensive, easy to operate, and relatively free from breakdown. Training aids which are interactive are helpful. Further, a need exists for a tool which requires little or no maintenance, can be easily updated, and which can be made available in a large quantity and used in a wide variety of settings.

SUMMARY

The above-mentioned problems and others not expressly discussed herein are addressed by the present subject matter and will be understood by reading and studying this specification.

In varying embodiments, the present subject matter includes an apparatus, comprising a board including a coordinate system representing time, one or more colored areas representing cardiac device function and patient cardiac function, and a legend. Additionally, the present subject matter includes a first set of objects adapted for magnetic attachment to the board, the objects representing cardiac device function and including colors matching the one or more colored areas of the magnetic board and the legend, the objects sized for alignment with the coordinate system. The present subject matter includes embodiments wherein the first set of objects are magnetically attached to the board and demonstrate cardiac device function over time.

In varying examples, the present subject matter includes a method for demonstrating cardiac device function and patient cardiac function over time to a user, comprising placing a first set of objects on a magnetic board, the magnetic board including a coordinate system and one or more colored areas representing cardiac device function and patient cardiac function, aligning a first set of objects representing cardiac device function with the one or more colored areas of the magnetic board, and aligning a second set of objects representing patient cardiac function with the coordinate system. Additionally, the present subject matter includes embodiments wherein the user interacts with assembled first set of objects, second set of objects, and the magnetic board to demonstrate cardiac device function over time.

In some examples, the present subject matter includes an apparatus for demonstrating patient cardiac function and cardiac device function over time, comprising a board including a rectangular coordinate system with one axis representing time, a first colored area representing cardiac device function during atrial stimulation, a second colored area representing cardiac device function during stimulation of an atria and the right ventricle, a third colored area representing cardiac device function during stimulation of the right ventricle, a fourth colored area representing stimulation of the left ventricle, and a fifth colored area representing electrical signals in a cardiac system. Additionally, the present subject matter includes a first set of objects adapted for magnetic attachment to the board, the first set of objects representing cardiac device function and including colors matching the one or more colored areas of the board, the first set of objects sized for alignment with the rectangular coordinate system and shaped geometrically with at least one side representing time, and a second set of objects adapted for magnetic attachment to the board, the second set of objects representing patient cardiac function and including colors matching the one or more colored areas, the second set of magnets sized for alignment with the rectangular coordinate system and shaped geometrically with at least one side representing time. Also, the present subject matter includes embodiments wherein the assembled first set of objects, second set of objects, and board represent the relationship between cardiac device function, patient cardiac function, and time.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. It will be apparent, however, to one skilled in the art that the various embodiments may be practiced without some of these specific details. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
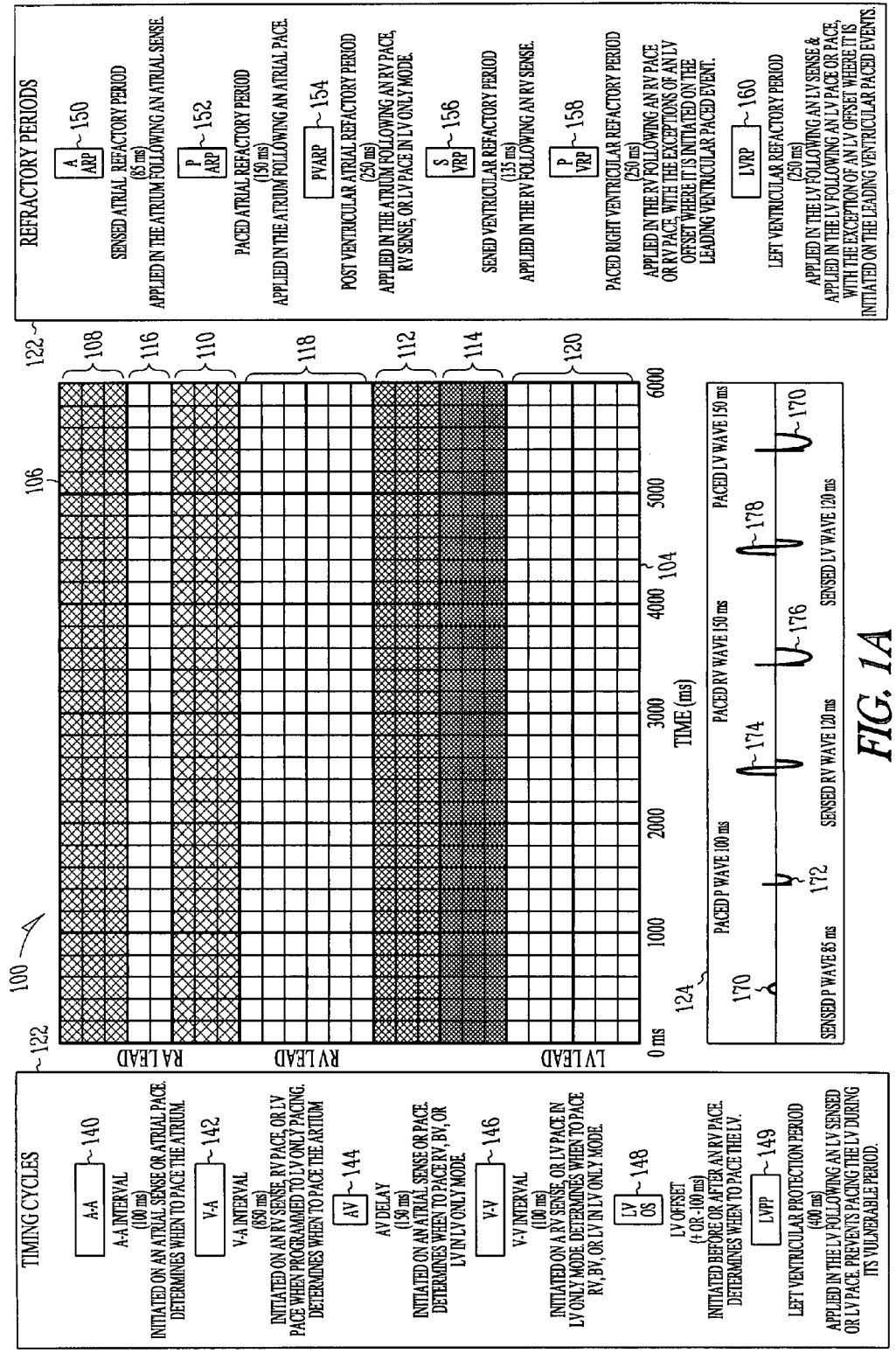
FIGS. 1A–1B illustrate an apparatus for demonstrating pacing system function and patient cardiac function, according to one embodiment of the present subject matter.
Figure 1B:
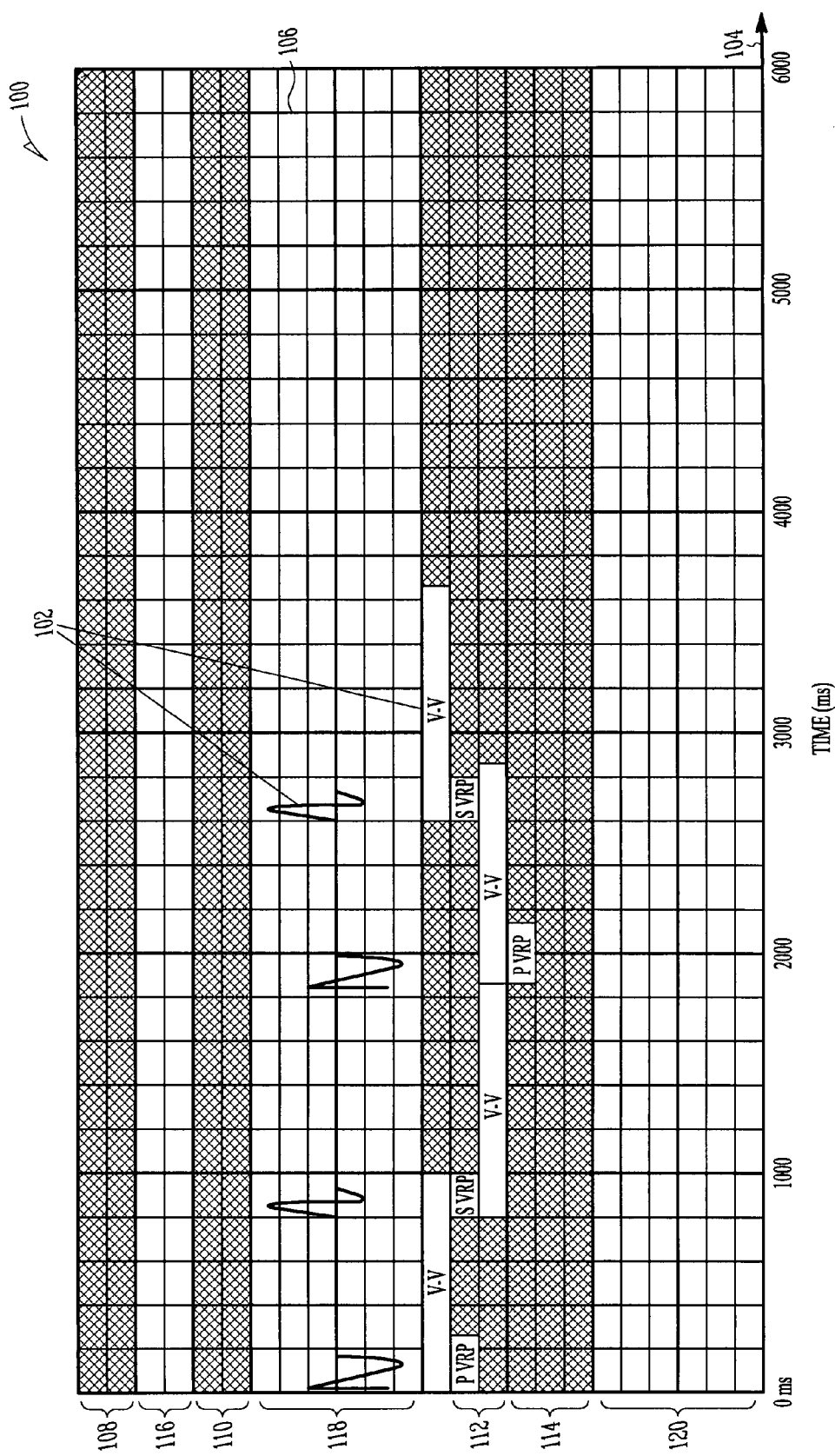

FIGS. 1A–1B illustrate various apparatus for demonstrating pacing system function and patient cardiac function, according to various embodiments of the present subject matter. For clarity, similar aspects of these figures are represented by common numbers. It should be understood, however, that these relationships are provided for clarity, and are not to be interpreted as exclusive or exhaustive of the scope of the present subject matter.

FIG. 1A illustrates an apparatus for demonstrating pacing system function and patient cardiac function, according to one embodiment of the present subject matter. Varying embodiments include a board 100 covered at least in part with printing. For example, one embodiment uses a magnetic whiteboard. Additionally, the apparatus uses objects, or "tags", which magnetically attach to the board in varying modes. In addition, some examples include a printed coordinate system 106 and tags adapted to align with the coordinate system. One embodiment includes a coordinate system resembling a Cartesian coordinate system, in which the horizontal axis of the coordinate system represents time 104, and in which aspects of the vertical axis include gradation representative of electrical signals present in the right atrium, the right ventricle, the left ventricle, and elsewhere. Some examples which include vertical gradation resemble an electrocardiogram or electrogram. One example includes vertical graduations representing approximately 5 millivolt increments.

Various embodiments of the magnetic tags have a width representing the duration of the respective functions printed on the tag. For example, one or more tags can represent pacing system function and patient cardiac function, and demonstrate the duration of these functions using width. In other words, in one example, by attaching a magnetic tag to the board, a user can demonstrate pacing system function over time, patient cardiac function over time, and how a pacing system interacts with patient physiology.

It should be noted that the scope of the present subject matter could include other types of boards suited for displaying printing, such as corkboards or chalk boards. One embodiment includes printing which emulates an electrocardiogram, with horizontal graduations representing approximately 200 millisecond tick marks 106. Additionally, the scope of the present subject matter is not limited to magnetic displays, and includes other means for attaching objects to a board, including embodiments using hook-and-loop fasteners.

The present subject matter includes a range of tags. Varying tags are listed in the legend 122 and the legend 124. For clarity, the following descriptions apply to a patient with a heart rate of approximately 60 cardiac events per minute, measured at a single arbitrary chamber, which coincides with 1000 millisecond event interval. However, this interval is for demonstration only, and other rates are possible without departing from the present subject matter.

One embodiment includes tag 140 representing an atrial interval "A—A", symbolizing the time between atrial events. In this example, the interval is initiated on an atrial sense or an atrial pace, and lasts about 1000 milliseconds. In various embodiments, the interval assists in calculating when to pace the atrium.

An additional form of the present subject matter includes a ventricular-atrial interval "V-A" tag 142, representing the interval between a ventricular event and an atrial event. In one example, this interval is initiated upon a right ventricular sense, a right ventricular pace, or a left ventricular pace in examples where the device is programmed to pace the left ventricle only. In varying embodiments, this interval determines when to pace the atrium, and lasts about 850 milliseconds.

Another embodiment includes an atrial-ventricular delay "AV" 144, representing the interval between an atrial event and a ventricular event. In varying embodiments, this interval commences on an atrial sensed or paced event, and lasts approximately 150 milliseconds. In varying embodiments, this interval is used to determine when to pace the right ventricle, both ventricles, or the left ventricle in a mode which paces the left ventricle only.

It should be noted that these teachings reference the right atrium, but other embodiments within the scope of the present subject matter include events which occur in the left atrium, or events which occur in both atria.

Additional examples include a ventricle-ventricle interval, "V—V" 146 representing the interval between ventricular events. In varying embodiments, the interval is initiated upon a right ventricular pace, a sensed right ventricular event, or a paced left ventricular event in modes where the device paces the left ventricle only. In varying embodiments, this interval is used to determine when to pace the right ventricle, both ventricles, or the left ventricle in an mode which paces the left ventricle only, and lasts about 1000 milliseconds.

A further example includes a left ventricular offset "LVOS" 148, which represents the interval between a paced left ventricular event and a paced right ventricular event. In varying embodiments, this interval determines when to pace the left ventricle, and has a value of positive or negative approximately 100 milliseconds.

Additionally, one embodiment includes a left ventricular protection period "LVPP" 149, which represents an interval during which the device protects the left ventricle. In varying embodiments, this interval is applied following a left ventricular paced or sensed event. This mode of operation, in various embodiments, prevents pacing the left ventricle during the vulnerable period. The vulnerable period represents aspects of physiological function, including, but not limited to, a time interval after a ventricular event in which the heart is vulnerable to further pacing events occurring. In other words, after a ventricular event, the heart should not be paced again for a minimum time interval. If the heart is paced prematurely, there is a risk of damaging the heart.

One embodiment includes a sensed atrial refractory period "SARP" 150, which represents a refractory period occurring after a sensed atrial event. In varying embodiments, this interval is applied in the atrial channel following a sensed atrial event, and lasts about 85 milliseconds. In exemplary forms, the refractory period represents a time interval which follows effective tissue stimulation, during which excitable tissue fails to respond to a stimulus of threshold intensity. Threshold intensity, in varying examples, is a stimulus which would be sufficient to induce a propagating wave of cardiac action potentials. During a refractory period, an exemplary device can sense activity, but will not initiate a timing cycle or a protection period.

One form of the present subject matter includes a paced atrial refractory period "PARP" 152, which represents the refractory period after a paced atrial event. In varying embodiments, this interval is applied in the atrial channel following a paced atrial event. This interval, in one example, lasts about 150 milliseconds.

Another form of the present subject matter includes a post ventricular atrial refractory period "PVARP" 154, which represents an atrial refractory period applied following a right ventricular intrinsic or paced event, or the pacing of a left ventricle in left ventricular only mode. This interval, in varying examples, lasts approximately 250 milliseconds, and is applied in the atrium following a paced right ventricular event, a sensed right ventricular event, or a paced left ventricular event in a mode which only paces the left ventricle.

Another variant includes a sensed ventricular refractory period "SVRP" 156, which represents the refractory period applied following a sensed right ventricular event. This interval, in varying embodiments, lasts approximately 135 milliseconds, and is applied in the right ventricle following a sensed right ventricular event.

In varying examples, a paced right ventricular refractory period "PVRP" 158 represents the prohibition of a right ventricular pace for about 250 milliseconds after a ventricular pace. This interval is applied in the right ventricle following a right or left ventricular pace, with the exception of modes in which a left ventricle offset is initiated on the leading ventricular paced event.

Another example includes a left ventricular refractory period "LVRP" 160, which represents a refractory period applied in the left ventricle following a left or right ventricular pace, and which represents a refractory period applied in the left ventricle following a sensed intrinsic pace in the left ventricle, with the exception of modes in which a left ventricle offset is initiated on the leading ventricular paced event. This interval, in varying embodiments, lasts about 250 milliseconds.

The present subject matter, in various embodiments, includes tags which represent morphological electrical events, referenced as waves or complexes, which, in various embodiments, occur in the right atrium, and the right and left ventricle. For example, tag 170 represents a sensed P-wave which lasts about 85 milliseconds. Tag 172 represents, in varying examples, a paced P-wave which lasts about 100 milliseconds. Various examples include tag 174, which represents a sensed RV-wave which lasts about 120 milliseconds. Tag 176 represents, in various embodiments, a paced RV-wave which lasts about 150 milliseconds. Tag 178 represents, in various examples, a sensed LV-wave which lasts about 120 milliseconds. Additionally, tag about 180 represents a paced LV-wave which lasts about 150 milliseconds, in various embodiments of the present subject matter. This list is not intended to be exhaustive or exclusive, but is demonstrative of the types of complexes which are used with the present subject matter. It should be noted that the present subject matter also includes electrical events which occur in other portions of the heart.

In various embodiments, wider tags represent tags which involve a longer time period. In one embodiment, the PVRP is wider than the SRP to demonstrate that the PVRP includes a longer time interval than the SVRP. By reading and understanding these teachings, and other teachings within the scope of the present subject matter, it is apparent that a grid which represents time, and tags which represent time, can be employed to demonstrate functions which occur over time.

One embodiment of the board includes a coordinate system including various colored areas. For example, a first colored area 108 represents cardiac device function during stimulation of the right atrium, including atrial timing cycles and atrial refractory periods. A second colored area 110 represents pacing system function during sensing and pacing in the right atrium and the right ventricle, including, but not limited to, associated timing cycles and refractory periods. A third colored area 112 represents cardiac device function during sensing and pacing in the right ventricle, including, but not limited to, associated timing cycles and refractory periods. A fourth colored area 114 represents cardiac device function during sensing and pacing in the left ventricle, including, but not limited to, associated timing cycles and refractory periods. Boards using more colored areas or less colored areas also fall within the scope of the present subject matter.

Additionally, a fifth colored area, or set of colored areas, which is white in one embodiment, includes, but is not limited to, areas 116, area 118, and area 120. In varying embodiments, these areas represent electrical signals occurring in varying regions of the heart. More specifically, in one embodiment, area 116 represents signals occurring in the right atrium, area 118 represents signals occurring in the right ventricle, and area 120 includes signals occurring in the left ventricle. Because of these relationships, the present subject matter benefits from placing area 116, area 118, and area 120 proximal to related colored areas which include timing cycles and refractory periods. For example, in one embodiment, area 116, which represents signals occurring in the right atrium in varying embodiments, is placed adjacent to area 108, which represents cardiac device function during stimulation of the right atrium and includes, in various embodiments, timing cycles and refractory periods. Additional embodiments place area 118 adjacent area 112. Also, varying embodiments place area 120 adjacent to area 114. By placing areas representing a specific portion of the cardiac system nearby areas which represent cardiac events, a teaching aid can provide more clarity in explanation of pacing device function. Additionally, in various embodiments, the present subject matter, when used as such, can assist in the explanation of the relationship between patient physiology and pacing device function.

It should also be noted that the complexes which occur in areas 116, 118 and 120 can, in various embodiments, represent an intended patient response, a cardiac function in a well or an unwell patient, a pacing system function in the heart, and other types of electrical events which occur in a patient.

For use with the colored areas, various examples also provide colored tags. In some embodiments, these tags represent timing cycles and refractory periods. In one embodiment, tags representing refractory periods are a different shade than related timing cycle tags. For example, if a timing cycle tag and a refractory period tag are to match the same colored area on the board, all the tags will be in the same family of colors, but timing cycle tags will be a different shade than the refractory period tags.

In one example, tags 140, 150, and 152 are colored to match the colored area 108. A user will understand by looking at the device that these tags are to be placed in area 108. Likewise, in various embodiments, tags 142, 144, and 154 are to be matched with colored area 110. Additionally, in some examples, tags 146, 156, and 158 are to be matched with area 112. Various examples include tags 148, 150, and 160 which match with area 114. By using colored areas on the board, and the using tags which are colored, the teaching aid is useful for demonstrating where a tag should be placed in relation to a coordinate system or in relation to other functions displayed on the board. Additionally, by providing multiple colored areas, the teaching aid is useful to manage the content of the board and reduce confusion and clutter.

In various embodiments, by using color coding, it is apparent to a user that various tags containing complexes belong with specific areas. Tags 170, 172, 174, 176, 178, and 180 are to correspond with areas 116, 118, and 120, in various embodiments of the present subject matter. While these complexes could be displayed in any one of these areas, they are most useful when matched with particular timing cycles or refractory periods. As such, in various embodiments, the complexes include colored printing. In other words, in various examples, the wave-form is printed from lines of various colors. When a user views the device, it is obvious that tags 170 and 172 match the colored area 108, and therefore are to be placed in area 116, in various embodiments. Additionally, in some examples, tags 174 and 176 match the colored area 112, and are to be placed in area 118. Also, tags 178 and 180 match the colored area 114, and area to be placed in the area 120, in various embodiments of the present subject matter.

The present subject matter teaches that by using various colors, magnets, and other features described here, it is possible to supply a training aid which assists a user in understanding pacing system timing and function, and how they interact with a patient's physiology, particularly physiology including, but not limited to, cardiac function.

In various embodiments, the board 100 is a large whiteboard, suitable for hanging in a room, and sized for visibility from varying distances. In on embodiment, the board 100 is a magnetic sheet covered in a vinyl graphic. Other embodiments are sized for placement on a desktop, and additional embodiments are sized for individual use. One embodiment is large enough for a small presentation to several people, and is further adapted for easy stowage and transport by traveling instructors.

One benefit of the present subject matter is that it is rugged. A whiteboard and magnets are less susceptible to problems such as electronic glitches or damage. Further, a whiteboard is inexpensive. By providing a whiteboard surface, instructors and students can draw on the teaching aid. Additionally, by providing an interactive environment, the teaching aid helps improve student interaction, which can improve the interest of students in learning about the subject matter. In addition to these benefits, the present subject matter is relatively simple to update in order to reflect new therapies.

Another benefit is that it presents device functionality information in a simple manner, but is not limited to simple concepts. Because persons use teaching aids to teach a wide range of students at varying skill levels, a device which can be presented in a simple form or a complex form is useful. Such a device is useful to sales people, training personnel, persons involved in technical service, and to engineers who develop medical device technology, as well as others. The device can be used to illustrate basic concepts of cardiac pacing, as well as advanced functions such as cross-functional aspects of different cardiac stimulation methods.

FIG. 1B demonstrates one example of pacing system function. By describing this example, one can better understand the function of the teaching aid. However, this example is not to be understood as limiting, and is provided solely for the benefit of describing how the device can be used to explain device functionality.

Various embodiments of the magnetic tags 102 have a width representing the duration of the respective functions printed on the tag. The one ore more tags 102 can represent, in various embodiments, pacing system function and patient cardiac function, and can demonstrate the duration of these functions using the width of these tags 102. Therefore, by attaching a magnetic tag 102 to the board, a user can demonstrate pacing system function over time, patient cardiac function over time, and how a pacing system relates to physiological activity.

The example illustrated in FIG. 1B represents a VVI-RV pacing mode. A VVI-RV pacing mode includes a pacing apparatus that paces and senses only in the right ventricle, and is inhibited by sensed electrical activity. Included in this mode is a paced ventricular refractory period, or PVRP, and an intrinsic, or sensed ventricular refractory period, SVRP. In this example, the right ventricle of the patient is paced at about 0 milliseconds. This is represented by a complex in area 118. Concurrent to that, a paced ventricular refractory period is initiated, and represented by a "PVRP" tag. Also concurrent is a ventricular timing cycle represented by "V—V".

Next, an intrinsic event occurs in the right ventricle at about 800 milliseconds, represented by a ventricular complex in area 118. Concurrent to that event is the initiation of a sensed ventricular refractory period, represented by an "SVRP" tag. This is also accompanied by a ventricular refractory period "V—V".

Following that, the right ventricle of the patient is paced at about 1850 milliseconds. This is represented by a complex in area 118. Concurrent to that, a paced ventricular refractory period is initiated, represented by a "PVRP" tag. This also initiates a ventricular timing cycle represented by "V—V".

Next, there is an additional intrinsic event in the right ventricle at about 2600 milliseconds, represented a complex in area 118. Concurrent to that, a sensed ventricular refractory period is initiated, indicated by an "SVRP" tag, and again accompanied by a ventricular refractory period "V—V". Finally, the VVI-RV mode scenario completes at about 3500 milliseconds.

Figure 2A:
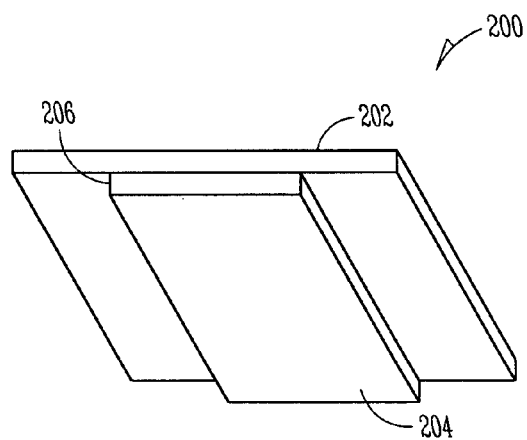
FIGS. 2A–2B illustrate a perspective view of an object for attachment to a board, according to one embodiment of the present subject matter.
Figure 2B:
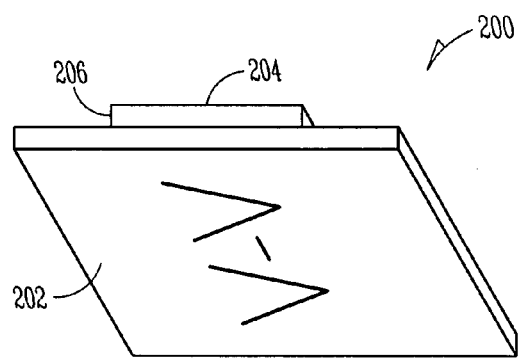

FIGS. 2A–2B illustrate perspective views of an object 200 for attachment to the board, according to one embodiment of the present subject matter. In various embodiments, a tag includes a first surface 204 adapted to contact the board, and a second surface 202 adapted to display printing, and a step 206 between the first surface and the second surface, wherein the second surface has a larger area than the first surface.

Figure 3:
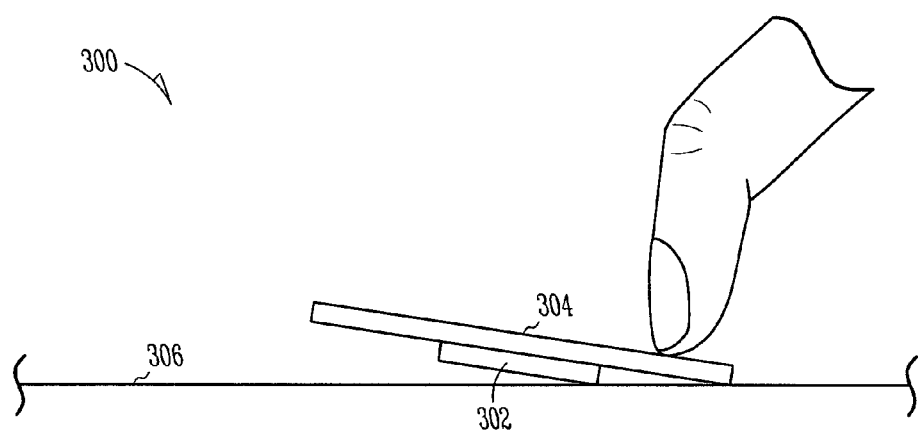
FIG. 3 illustrates a side view of a tag being depressed, according to one embodiment of the present subject matter.

FIG. 3 illustrates a side view of a tag being depressed, according to one embodiment of the present subject matter. In varying embodiments, a tag includes a magnetic portion 302 glued to a plastic portion 304. Magnetic material 302 is adapted for magnetic attachment to magnetic surface 306, which is a board in various embodiments. By pressing the tag 300, the tag becomes easier to grasp, thereby making the teaching aid easier to use. These materials are provided only for illustration, however, and do not provide an exclusive or exhaustive list of structures or methods taught by the present subject matter.

Figure 4A:
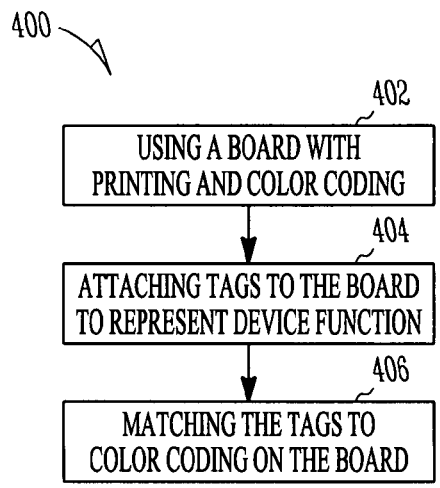
FIGS. 4A–4B illustrate methods of using training aids to demonstrate medical device function and patient cardiac function, according to varying embodiments of the present subject matter.
Figure 4B:
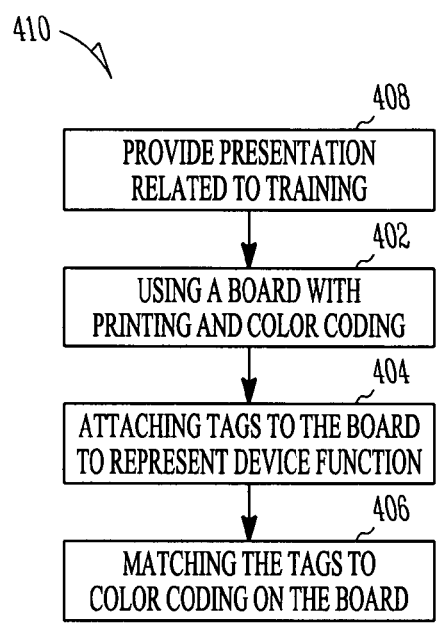

FIGS. 4A–4B illustrate methods of using a training aid to demonstrate pacing system function and patient cardiac function to a user, according to various embodiments of the present subject matter. For clarity, similar aspects of these figures are represented by common numbers. It should be understood, however, that these relationships are provided for clarity, and are not to be interpreted as exclusive or exhaustive of the scope of the present subject matter.

FIG. 4A illustrates one method 400 of using a training aid to demonstrate pacing system function and patient cardiac function to a user, according to one embodiment of the present subject matter. Varying embodiments include a board having a printed coordinate system and one or more colored areas representing pacing system function and patient cardiac function 402. Varying embodiments also include attaching to the board 404 one ore more tags adapted for magnetic attachment to the board, the tags including printing representing pacing system function and including colors matching the one or more colored areas of the magnetic board. Additional examples include arranging the tags 406 on the board to demonstrate pacing system function over time and patient cardiac function over time, and the relationship between various device functions and physiology.

FIG. 4B illustrates method 410 of using a training aid and a presentation to demonstrate pacing system function and patient cardiac function to a user, according to one embodiment of the present subject matter. Varying embodiments are complemented by including a presentation containing audio information, video information, or audio and video information 408.

By using these methods, or other embodiments of the present subject matter, an instructor can present aspects of the present subject matter representing particular patient scenarios, and students can respond by using the teaching aid to understand how a patient might respond to pacing.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

We claim:

1. An apparatus, comprising:
   a board including a coordinate system representing time, one or more colored areas representing cardiac device function and patient cardiac function, and a legend; and
   a first set of objects adapted for magnetic attachment to the board, the objects representing cardiac device function and including colors matching the one or more colored areas of the magnetic board and the legend, the objects sized for alignment with the coordinate system;
   wherein the first set of objects are magnetically attached to the board and demonstrate cardiac device function over time.

2. The apparatus of claim 1, wherein the board includes a whiteboard surface.

3. The apparatus of claim 1, wherein the board includes a coordinate system resembling a Cartesian coordinate system with one axis representing time.

4. The apparatus of claim 3, wherein the printed coordinate system emulates an electrocardiogram including 200 millisecond tick marks.

5. The apparatus of claim 1, including a second set of objects adapted for magnetic attachment to the board, the second set of objects representing patient cardiac function and including colors matching the one or more colored areas, the second set of objects sized for alignment with the coordinate system.

6. The apparatus of claim 5, wherein the first set of objects and the second set of objects are magnetically attached to the board and represent the relationship between cardiac device function, patient cardiac function, and time.

7. The apparatus of claim 5, wherein the second set of objects represent one of the group including a cardiac condition sufficient to result in a device response, a cardiac condition resulting from a device response, and a cardiac condition insufficient to result in a device response.

8. The apparatus of claim 7, wherein the first set of objects and the second set of objects are shaped geometrically with the size of one or more sides representing time.

9. The apparatus of claim 5, wherein one of the group including the first set of objects, the second set of objects, or the first set of objects and the second set of objects includes a first surface adapted to contact the board, and a second surface adapted to display printing, and a step between the first surface and the second surface, wherein the second surface has a larger area than the first surface.

10. The apparatus of claim 9, wherein pressing the second surface tilts the object, positioning it for grasp by the user.

11. A method for demonstrating cardiac device function and patient cardiac function over time to a user, comprising:
    placing a first set of objects on a magnetic board, the magnetic board including a coordinate system and one or more colored areas representing cardiac device function and patient cardiac function;
    aligning a first set of objects representing cardiac device function with the one or more colored areas of the magnetic board; and
    aligning a second set of objects representing patient cardiac function with the coordinate system,
    wherein the user interacts wit assembled first set of objects, second set of objects, and the magnetic board to demonstrate cardiac device function over time.

12. The method of claim 11, wherein a presentation including one of a group including audio information, video information, and audio and video information, is presented concurrent to using the board to represent cardiac device function and time.

13. The method of claim 11, wherein the board includes a whiteboard surface.

14. The method of claim 11, wherein the board includes a coordinate system resembling a Cartesian coordinate system with one axis representing time.

15. The method of claim 11, including attaching to the board a second set of objects adapted for magnetic attachment to the board, the second set of magnets including printing representing patient cardiac function and including colors matching the one or more colored areas, the second set of magnets sized for alignment with the coordinate system.

16. The apparatus of claim 15, wherein the first set of objects and the second set of objects are magnetically attached to the board and represent the relationship between cardiac device function, patient cardiac function, and time.

17. An apparatus for demonstrating patient cardiac function and cardiac device function over time, comprising:
   a board including a rectangular coordinate system with one axis representing time, a first colored area representing cardiac device function during atrial stimulation, a second colored area representing cardiac device function during stimulation of an atria and the right ventricle, a third colored area representing cardiac device function during stimulation of the right ventricle, a fourth colored area representing stimulation of the left ventricle, and a fifth colored area representing electrical signals in a cardiac system;
   a first set of objects adapted for magnetic attachment to the board, the first set of objects representing cardiac device function and including colors matching the one or more colored areas of the board, the first set of objects sized for alignment with the rectangular coordinate system and shaped geometrically with at least one side representing time; and
   a second set of objects adapted for magnetic attachment to the board, the second set of objects representing patient cardiac function and including colors matching the one or more colored areas, the second set of magnets sized for alignment with the rectangular coordinate system and shaped geometrically with at least one side representing time,
   wherein the assembled first set of objects, second set of objects, and board represent the relationship between cardiac device function, patient cardiac function, and time.

18. The apparatus of claim 17, wherein the board includes a whiteboard surface.

19. The apparatus of claim 17, wherein one of the group including the first set of objects, the second set of objects, or the first set of objects and the second set of objects includes a first surface adapted to contact the board, and a second surface adapted to display printing, and a step between the first surface and the second surface, wherein the second surface has a larger area than the first surface.

20. The apparatus of claim 19, wherein pressing the second surface tilts the object, positioning it for grasp by the user.

* * * * *

UNITED STATES PATENT AND TRADEMARK OFFICE
CERTIFICATE OF CORRECTION

PATENT NO. : 7,238,027 B2 Page 1 of 1
APPLICATION NO. : 10/895275
DATED : July 3, 2007
INVENTOR(S) : Kilvington et al.

It is certified that error appears in the above-identified patent and that said Letters Patent is hereby corrected as shown below:

In column 10, line 51 (Approx.), in Claim 11, delete "wit" and insert -- with --, therefor.

Signed and Sealed this

Sixteenth Day of October, 2007

JON W. DUDAS
*Director of the United States Patent and Trademark Office*